United States Patent
Kang et al.

(10) Patent No.: US 7,948,573 B2
(45) Date of Patent: May 24, 2011

(54) BACK-LIGHT ASSEMBLY AND LIQUID CRYSTAL DISPLAY INCLUDING THE SAME

(75) Inventors: Sang-min Kang, Chungcheongnam-do (KR); Jeoung-gwen Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 11/831,132

(22) Filed: Jul. 31, 2007

(65) Prior Publication Data

US 2008/0079865 A1 Apr. 3, 2008

(30) Foreign Application Priority Data

Aug. 10, 2006 (KR) ........................ 10-2006-0075831

(51) Int. Cl.
*G02F 1/1333* (2006.01)
*G02F 1/1335* (2006.01)
*G09F 13/04* (2006.01)
*G09F 13/08* (2006.01)

(52) U.S. Cl. ............ 349/58; 349/67; 362/97.2; 362/225

(58) Field of Classification Search ............... 349/58–60, 349/61, 67, 69, 70, 113; 362/225, 97.1, 97.2, 362/29, 30, 600, 614, 630, 632–634, 236, 362/240

See application file for complete search history.

(56) References Cited

U.S. PATENT DOCUMENTS

| | | | | |
|---|---|---|---|---|
| 4,712,163 A * | 12/1987 | Oxley | ............... | 362/29 |
| 4,796,169 A * | 1/1989 | Shemitz | ........................ | 362/282 |
| 6,880,953 B2 * | 4/2005 | Shin | ............................... | 362/225 |
| 7,344,257 B2 * | 3/2008 | Terashima et al. | ............ | 353/102 |
| 7,452,102 B2 * | 11/2008 | Ryu | .............................. | 362/225 |
| 7,490,952 B2 * | 2/2009 | Shimizu et al. | ............... | 362/225 |
| 7,503,685 B2 * | 3/2009 | Ura et al. | ...................... | 362/633 |
| 7,530,703 B2 * | 5/2009 | Ryu | .............................. | 362/29 |
| 7,658,525 B2 * | 2/2010 | Jeong | ............................ | 362/551 |
| 2002/0149713 A1 * | 10/2002 | Ishida et al. | .................... | 349/58 |
| 2004/0008512 A1 * | 1/2004 | Kim | ................................ | 362/235 |
| 2004/0047149 A1 * | 3/2004 | Amano et al. | ................ | 362/225 |
| 2004/0257792 A1 * | 12/2004 | Yu et al. | ........................... | 362/31 |
| 2005/0047111 A1 * | 3/2005 | Wu | ................................. | 362/31 |
| 2005/0057946 A1 * | 3/2005 | Kim | ................................ | 362/561 |
| 2006/0034090 A1 * | 2/2006 | Chen et al. | .................... | 362/390 |
| 2006/0133077 A1 * | 6/2006 | Roe | ................................ | 362/219 |

FOREIGN PATENT DOCUMENTS

JP 4-324821 * 11/1992

* cited by examiner

*Primary Examiner* — Mark A Robinson
*Assistant Examiner* — Robert Tavlykaev
(74) *Attorney, Agent, or Firm* — F. Chau & Associates, LLC

(57) ABSTRACT

A back-light assembly capable of preventing light leakage and a liquid crystal display including the same. The back-light assembly includes a lamp emitting light, a lamp holder comprising a reflecting part into which the lamp is inserted and an absorbing part, wherein the absorbing part absorbs the light, and the reflecting part reflects the light, a side member comprising a through hole, the lamp being inserted into the through hole, and a bottom chassis comprising a bottom surface and side surfaces, the side surfaces extending from the bottom surface.

14 Claims, 15 Drawing Sheets

BACK-LIGHT ASSEMBLY AND LIQUID CRYSTAL DISPLAY INCLUDING THE SAME

CROSS REFERENCE TO RELATED APPLICATION

This application claims priority from Korean Patent Application No. 10-2006-0075831 filed on Aug. 10, 2006, the disclosure of which is incorporated herein by reference in its entirety.

BACKGROUND OF THE INVENTION

1. Technical Field

The present invention relates to a back-light assembly and a liquid crystal display including the same, and more particularly, to a back-light assembly capable of preventing light leakage, and a liquid crystal display including the same.

2. Discussion of the Related Art

Liquid crystal displays (LCD) are used as flat panel displays. A liquid crystal display may include two substrates in which electrodes are formed and a liquid crystal layer that is interposed between the two substrates. Voltage is applied to the electrodes to rearrange liquid crystal molecules of the liquid crystal layer, thereby controlling the amount of light that passes through the liquid crystal layer.

The liquid crystal display may also include a back-light assembly that provides the light passing through the liquid crystal layer. The back-light assembly may include a lamp, various kinds of optical sheets, and a bottom chassis accommodating the lamp and the sheets.

A lamp holder, which supports a lamp, may be coupled to the bottom chassis by a joint groove formed thereon. Light may leak through the joint groove. Further, the lamp holder absorbs light, which may lower luminance in the vicinity of the lamp holder.

SUMMARY OF THE INVENTION

Embodiments of the present invention provide a back-light assembly and a liquid crystal display that can prevent light leakage and improve luminance.

According to an embodiment of the present invention, a back-light assembly includes a lamp emitting light, a lamp holder comprising a reflecting part into which the lamp is inserted and an absorbing part, wherein the absorbing part absorbs the light, and the reflecting part reflects the light, a side member comprising a through hole, the lamp being inserted into the through hole, and a bottom chassis comprising a bottom surface and side surfaces, the side surfaces extending from the bottom surface.

According to another embodiment of the present invention, a liquid crystal display includes a back-light assembly having a lamp emitting light, a lamp holder comprising a reflecting part into which the lamp is inserted and an absorbing part, wherein the absorbing part absorbs the light, and the reflecting part reflects the light, a side member comprising a through hole, the lamp being inserted into the through hole, and a bottom chassis comprising a bottom surface and side surfaces, the side surfaces extending from the bottom surface, and a liquid crystal panel assembly receiving the light.

BRIEF DESCRIPTION OF THE DRAWINGS

Embodiments of the invention can be understood in more detail from the following description taken in conjunction with the attached drawings, in which.

DETAILED DESCRIPTION OF EXEMPLARY EMBODIMENTS

Figure 1:
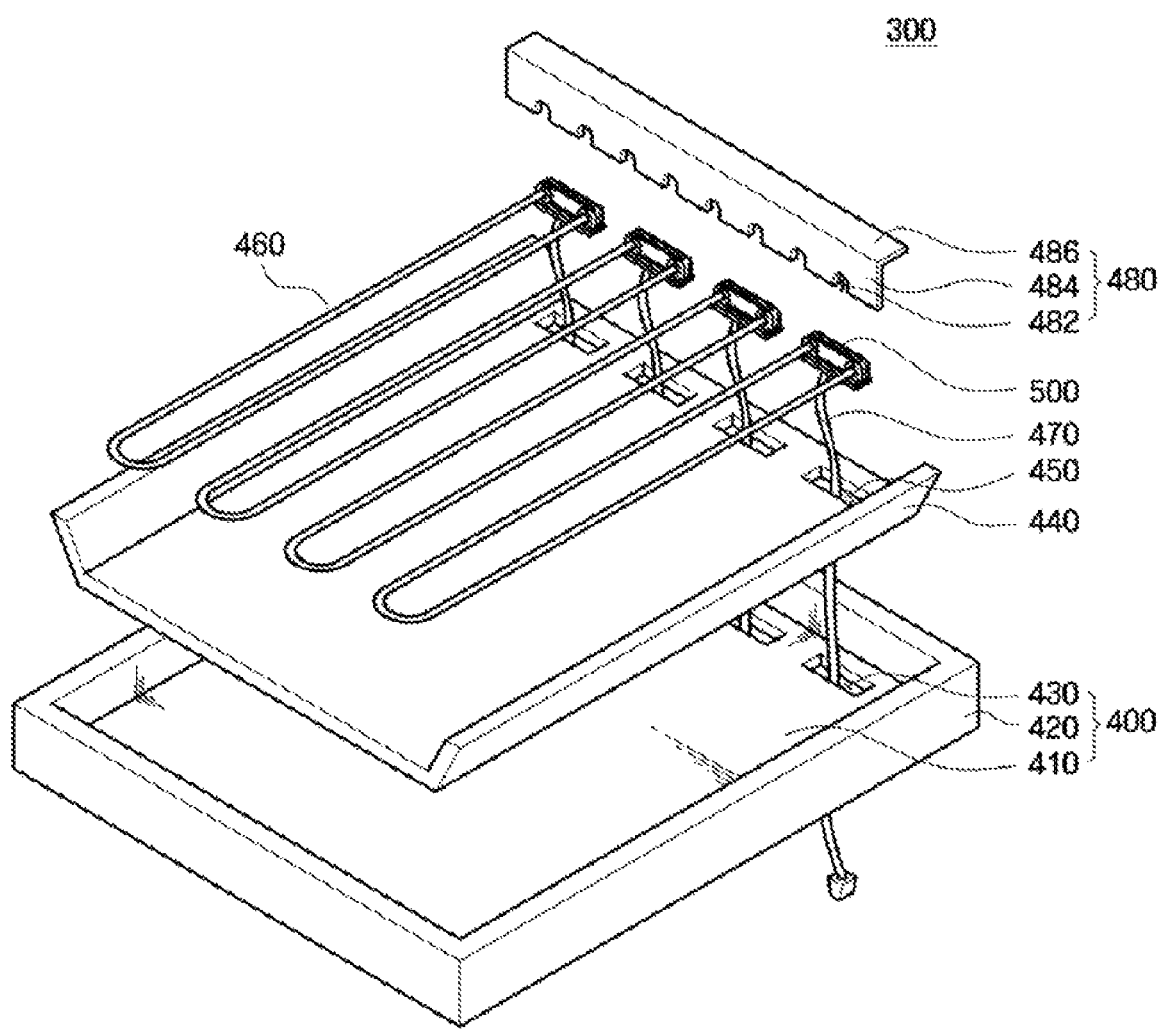
FIG. 1 is an exploded perspective view illustrating a back-light assembly according to an embodiment of the invention.

Exemplary embodiments of the present invention can be understood in more detail from the following description taken in conjunction with the accompanying drawings. The present invention may, however, be embodied in many different forms and should not be construed as being limited to the embodiments set forth herein. Like reference numerals may refer to like elements throughout the specification.

Figure 2A:
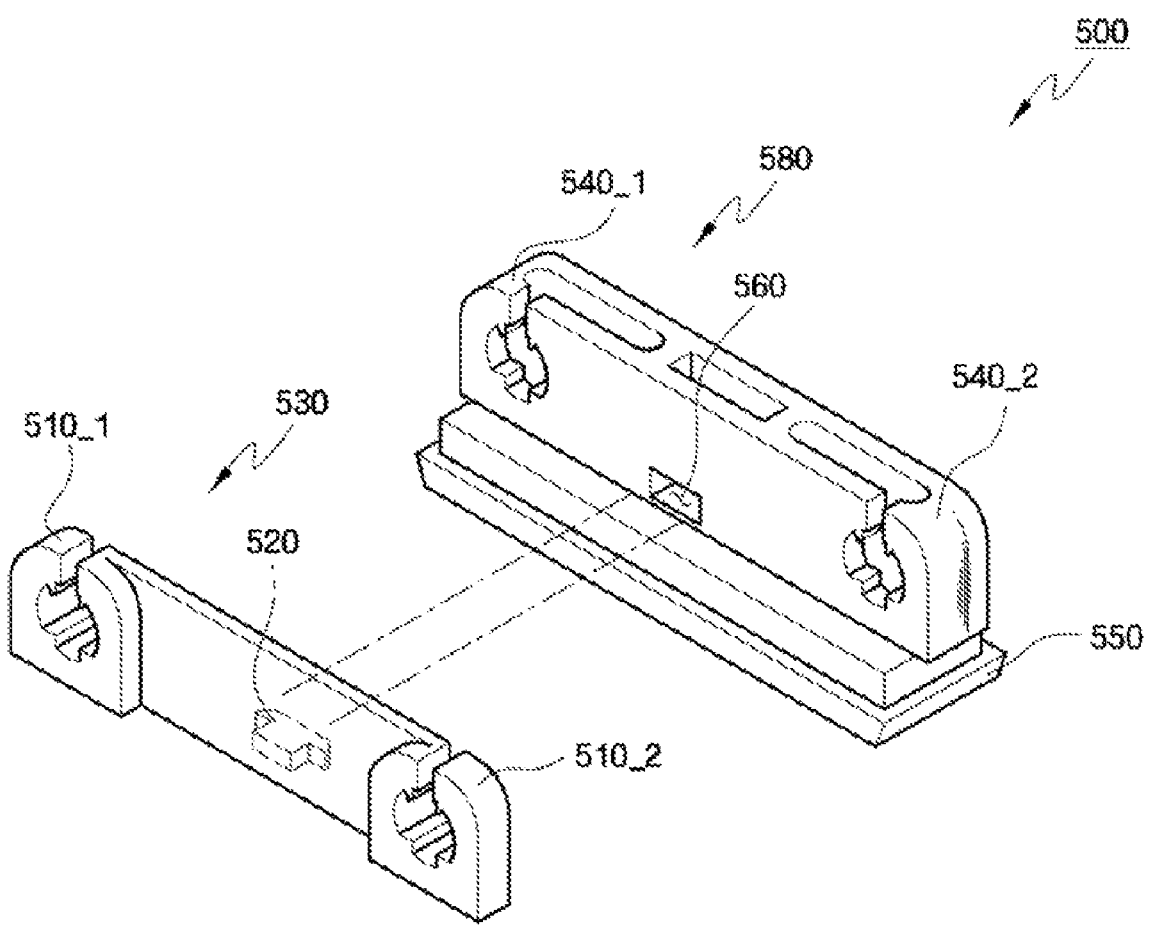
FIG. 2A is an exploded perspective view illustrating a lamp holder of FIG. 2A.
Figure 2B:
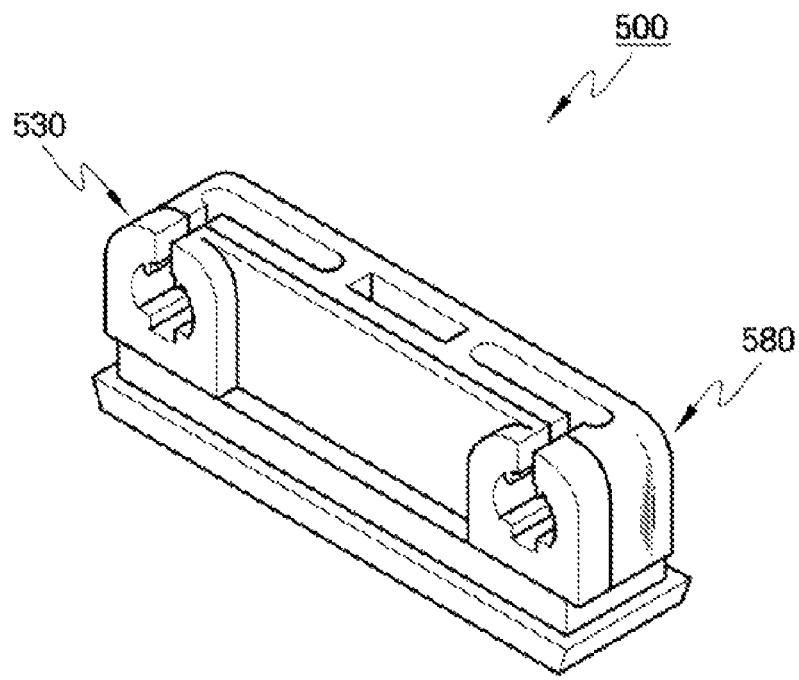
FIG. 2B is a perspective view illustrating the lamp holder of FIG. 2A.
Figure 2C:
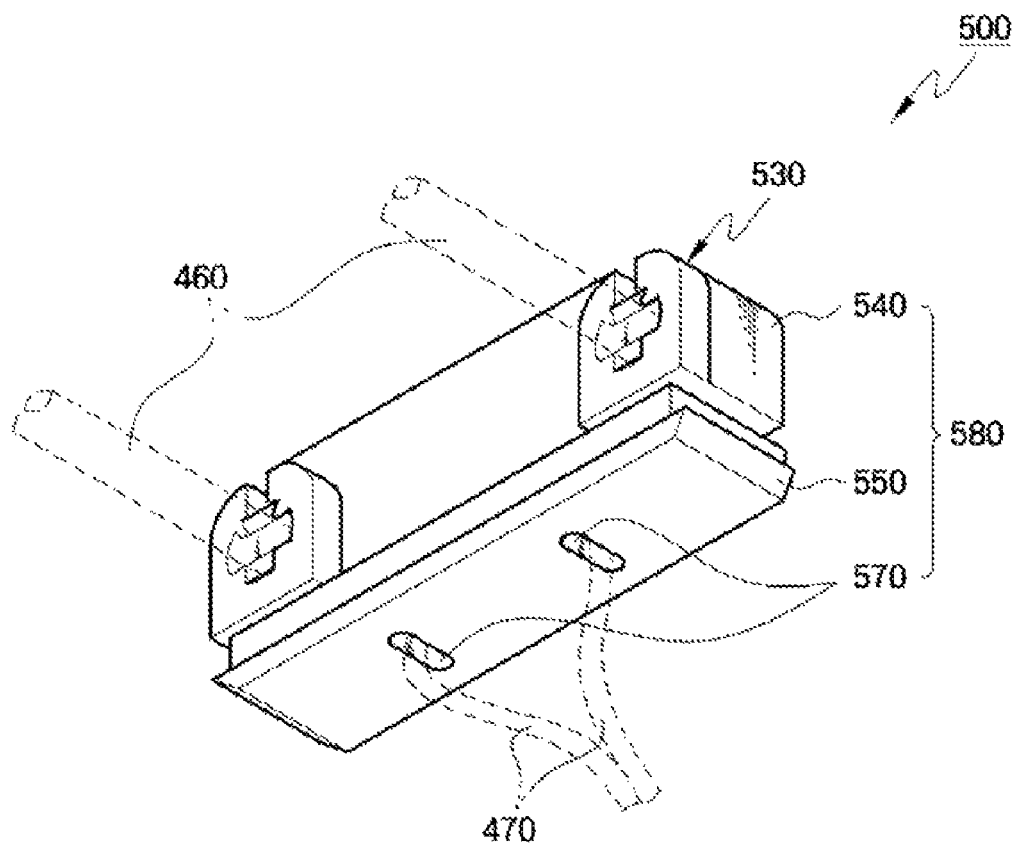
FIG. 2C is a bottom perspective view of the lamp holder of FIG. 2A.
Figure 2D:
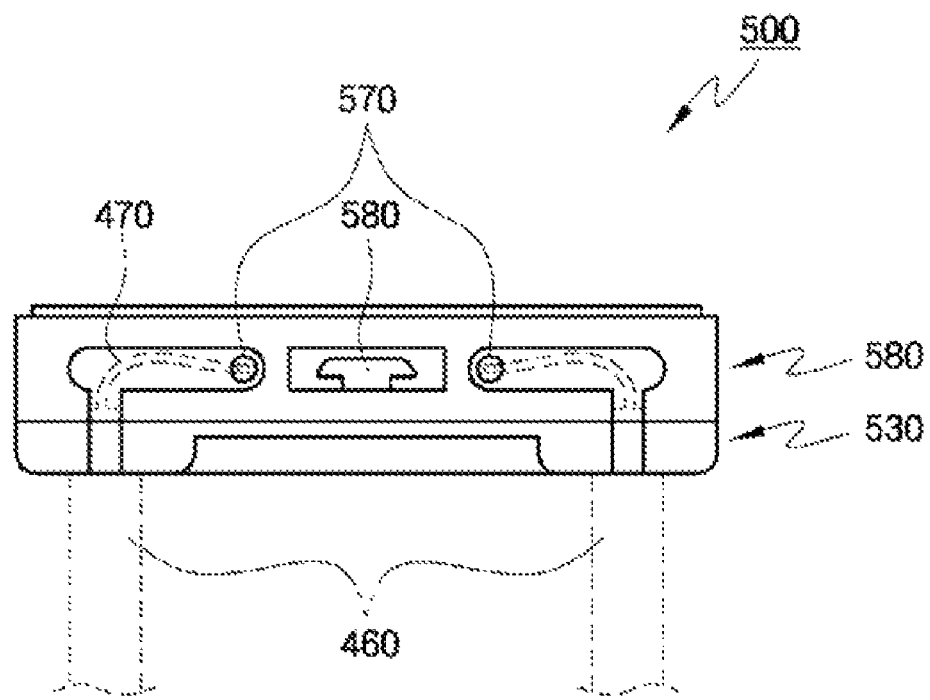
FIG. 2D is a plan view of the lamp holder of FIG. 2A.
Figure 3A:
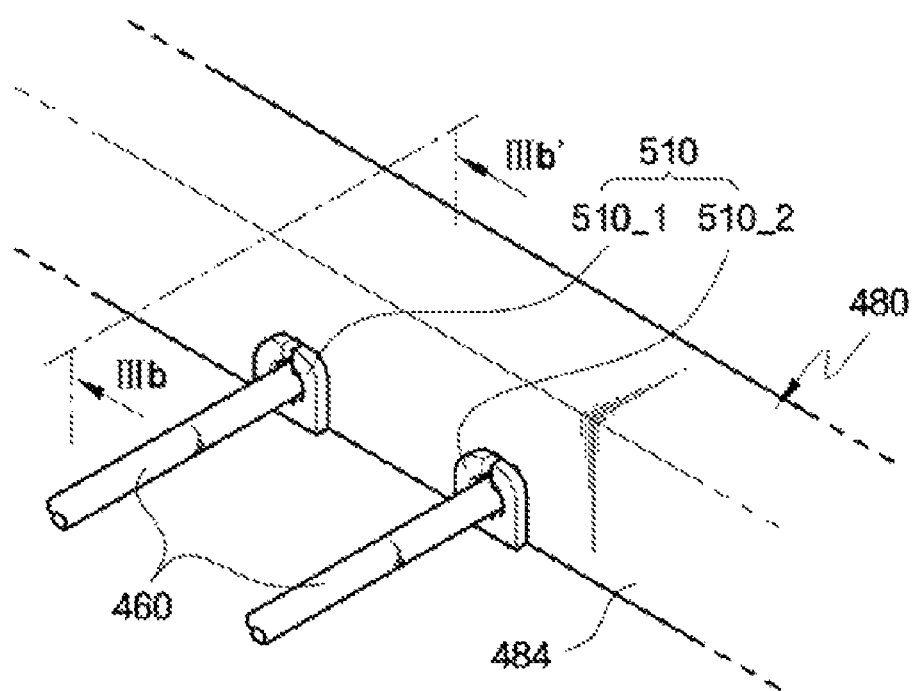
FIG. 3A is a perspective view illustrating an arrangement structure of the lamp holder and a side member according to an embodiment of the invention.
Figure 3B:
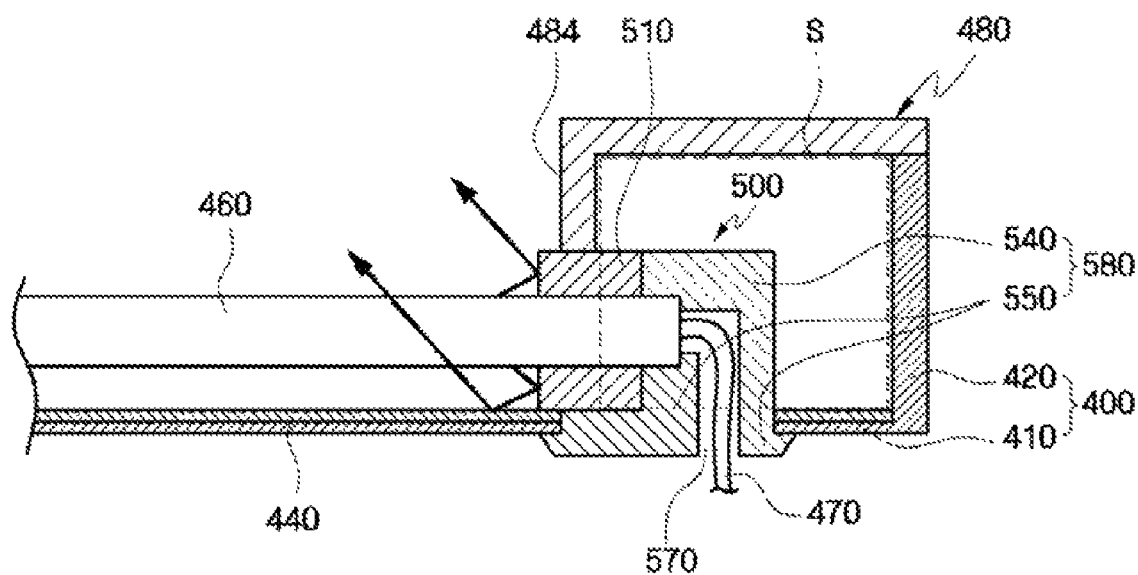
FIG. 3B is a cross-sectional view taken along the line IIIb-IIIb' of FIG. 3A.

A back-light assembly according to an embodiment of the invention will be described with reference to FIGS. 1 to 4B. FIG. 1 is an exploded perspective view illustrating a back-light assembly according to an embodiment of the invention. FIG. 2A is an exploded perspective view illustrating a lamp holder. FIG. 2B is a perspective view illustrating the lamp holder of FIG. 2A. FIG. 2C is a bottom perspective view of the lamp holder of FIG. 2A. FIG. 2D is a plan view of the lamp holder of FIG. 2A. FIG. 3A is a perspective view illustrating an arrangement structure of the lamp holder and a side member according to an embodiment of the present invention. FIG. 3B is a cross-sectional view taken along the line IIIb-IIIb' of FIG. 3A.

Referring to FIG. 1, a back-light assembly 300 according to an embodiment of the invention includes a bottom chassis 400, a reflecting plate 440, a plurality of lamps 460, a lamp holder 500, and a side member 480.

The bottom chassis 400 includes a rectangular shaped bottom surface 410 and a side surface 420 extending from the bottom surface 410, and one or more first joint holes 430 are formed in the bottom surface 410. The lamp holder 500 is received by and positioned in the first joint hole 430.

The reflecting plate 440 is positioned on the bottom surface 410 of the bottom chassis 400, and reflects light emitted from the lamp 460 toward an upper portion of the back-light assembly 300. One or more second joint holes 450 in which the lamp holder 500 is positioned are formed on the reflecting plate 440. In the reflecting plate 440, a pair of edges facing each other, as shown in FIG. 1, may be bent at a predetermined angle in order to reflect light emitted from the lamp 460 toward the upper portion of the back-light assembly 300.

The reflecting plate 440 may be integrated with the bottom surface 410 of the bottom chassis 400. In other words, the bottom chassis 400 can be formed of a material having high reflectivity such as aluminum (Al) or aluminum alloy, so as to function as the reflecting plate 440.

The plurality of lamps 460 is supported by the lamp holder 500 and emit light. The plurality of lamps 460 shown in FIG. 1 include U-shaped CCFLs (Cold Cathode Fluorescent Lamps), but is not limited thereto. The plurality of lamps 460 receive power voltage from the outside through a lamp wire 470 so as to emit light. The side member 480 includes an insertion surface 484 having a plurality of through holes 482 therein and a support surface 486 extending from the insertion surface 484. Each of the lamps 460 is inserted in each of the through holes 482, and the support surface 486 is supported by the side surface 420 of the bottom chassis 400. The side member 480 may support a diffusing plate (not shown) or an optical sheet (not shown) located at an upper side of the lamp 460. The side member 480 may be formed of a material having high reflectivity, or a tape formed of a material capable of reflecting light may be attached onto the insertion surface 484. The side member 480 may be a mold frame formed of a plastic material, but is not limited thereto. The side member 480 may be formed of rigid paper, or rigid synthetic fiber or the like.

In FIG. 1, the side member 480 is provided only to one side where the lamp holder 500 is located, but another side member (not shown) may be additionally provided on the side opposite to the one side.

The lamp holder 500 is coupled to the bottom chassis 400 and the reflecting plate 440 and supports the lamp 460. The lamp holder 500 prevents light leakage and improves luminance, and the lamp holder 500 will be described in detail below with reference to FIGS. 2A to 3B.

Referring to FIG. 2A, the lamp holder 500 includes a reflecting part 530 and an absorbing part 580. The reflecting part 530 includes first support parts 510_1 and 510_2, and a joint part 520. Further, the first support parts 510_1 and 510_2 are provided with holes formed in a lamp shape such that the lamps 460 are inserted in the holes. The joint part 520 of the reflecting part 530 can be hooked with a joint groove 560 of the absorbing part 580. The shape of the joint part 520 is not limited to the shape shown in FIG. 2A, and a method of joining the reflecting part 530 with the absorbing part 580 is not limited to the hook joint shown in FIG. 2A, but can be modified in various forms.

The absorbing part 580 includes second support parts 540_1 and 540_2, and a hook part 550 that is coupled to the bottom chassis 400 and the reflecting plate 440. Each of the second support parts 540_1 and 540_2 includes a hole formed in a lamp shape so as to receive the lamp 460 which is inserted into the reflecting part 530, and to support the lamp 460.

FIG. 2B shows the shape of the lamp holder 500 when the reflecting part 530 of FIG. 2A is joined with the absorbing part 580.

Referring to FIGS. 2C and 2D, at least one lamp wire drawing hole 570 is formed in the hook part 550, and the lamp wire 470, which is connected to an end of the lamp 460 and introduced in the reflecting part 530, can be drawn out to the rear side of the bottom chassis 400. The lamp wire 470 which is drawn out to the rear side of the bottom chassis 400 can be connected to an inverter (not shown) so that a driving voltage is applied to the lamp wire.

Referring to FIGS. 3A and 3B, some portions of the reflecting part 530 protrude through the through hole from an accommodating space S that is defined by the insertion surface 484 having the through holes 482 and the side surface 420 adjacent to the insertion surface 484. In other words, portions of the first support parts 510_1 and 510_2 protrude through the through holes 482. The bottom chassis 400 and the reflecting plate 440 are coupled to each other by the hook part 550. The lamp holder 500 improves luminance and prevents light leakage.

As shown in FIG. 3B, the first support part 510 reflects light emitted from the lamp 460 so as to improve luminance in the vicinity of the lamp holder 500. Since the bottom chassis 400 and the reflecting plate 440 are joined with each other between the first support part 510 and the hook part 550, light is prevented from leaking through the first joint hole 430 and the second joint hole 450 that are formed at the bottom chassis 400 and the reflecting plate 440, respectively. The reflecting part 530 or the first support part 510 may be formed of a material having high reflectivity, for example, a white resin.

The absorbing part 580 absorbs light leaked into the accommodating space S so as to prevent light from leaking through the first joint hole 430 and the second joint hole 450 that are formed at the bottom chassis 400 and the reflecting plate 440. Further, the absorbing part 580 absorbs light emitted through the lamp wire drawing hole 570 to prevent light leakage. The absorbing part 580 may be formed of a material having high absorbance, for example, a black resin.

Figure 4A:
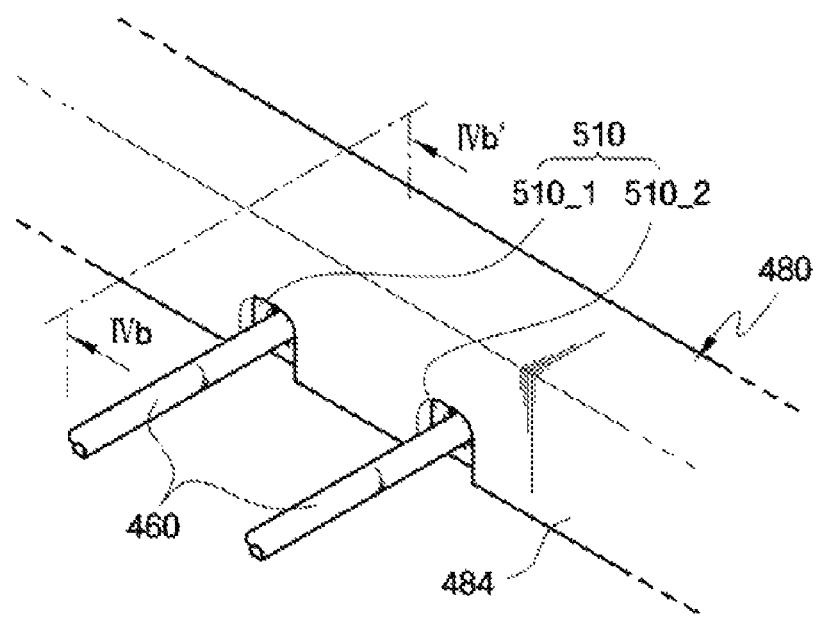
FIG. 4A is a perspective view illustrating an arrangement structure of a lamp holder of a back-light assembly and a side member according to an embodiment of the invention.
Figure 4B:
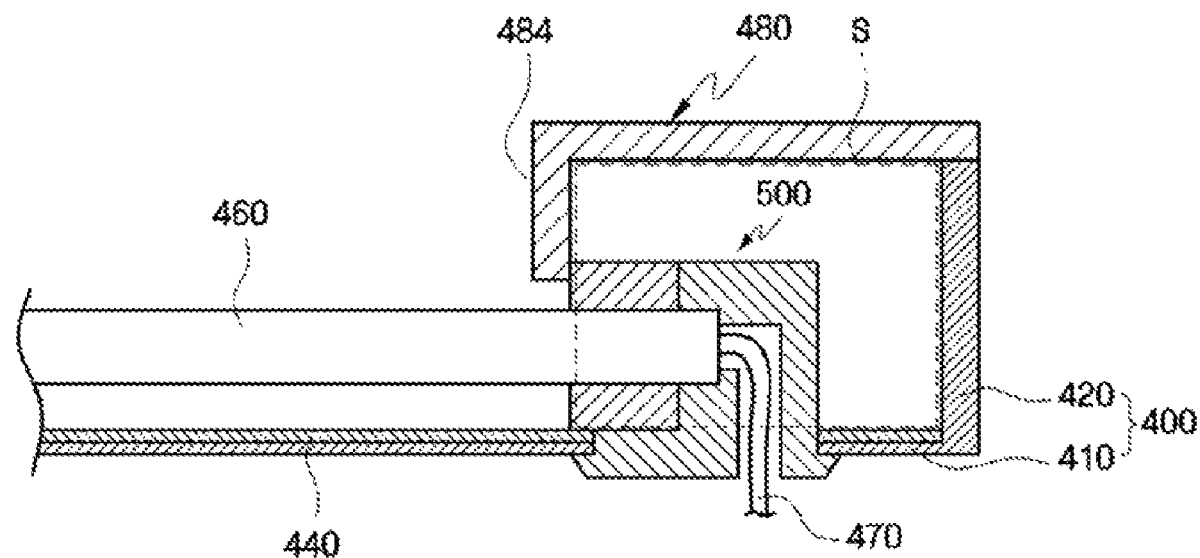
FIG. 4B is a cross-sectional view taken along the line IVb-IVb' of FIG. 4A.

The back-light assembly according to an embodiment of the invention will be described with reference to FIGS. 4A and 4B. FIG. 4A is a perspective view illustrating an arrangement structure of the lamp holder of the back-light assembly and a side member according to an embodiment of the invention. FIG. 4B is a cross-sectional view taken along the line IVb-IVb' of FIG. 4A. The lamp holder of the back-light assembly according to the embodiment described with reference to FIGS. 4A and 4B is formed in substantially the same shape as that of the lamp holder according to the embodiment described in connection with FIGS. 2A-3B, but an arrangement structure of the lamp holder and the side member is different.

Referring to FIGS. 4A and 4B, the lamp holder 500 is accommodated in the accommodating space S and does protrude through the holes 482. The side member 480 is formed of a material having high reflectivity. Alternatively, a tape formed of a material having high reflectivity is attached onto the insertion surface 484.

Figure 5A:
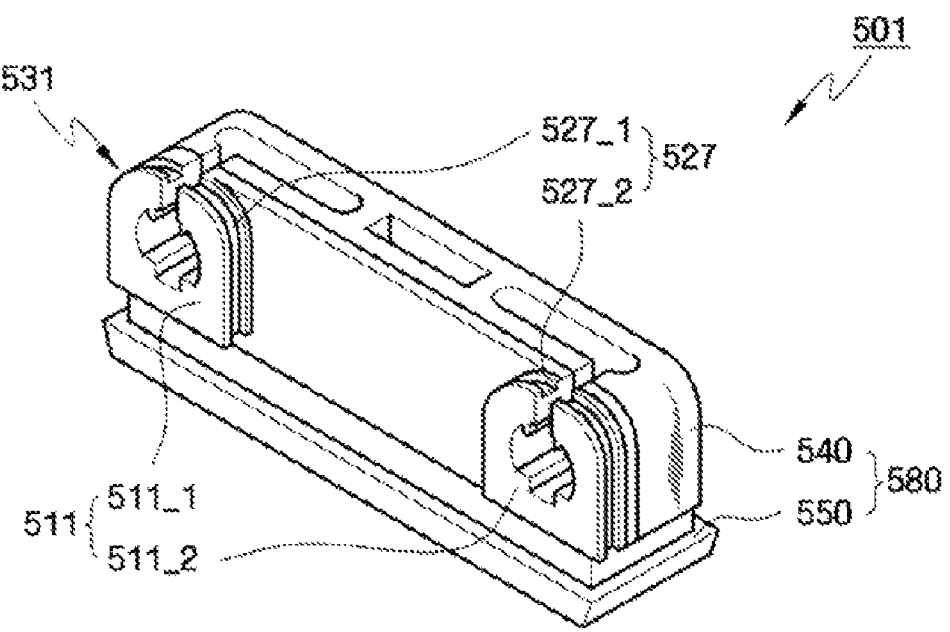
FIG. 5A is a perspective view illustrating a lamp holder of a back-light assembly according to an embodiment of the invention.
Figure 5B:
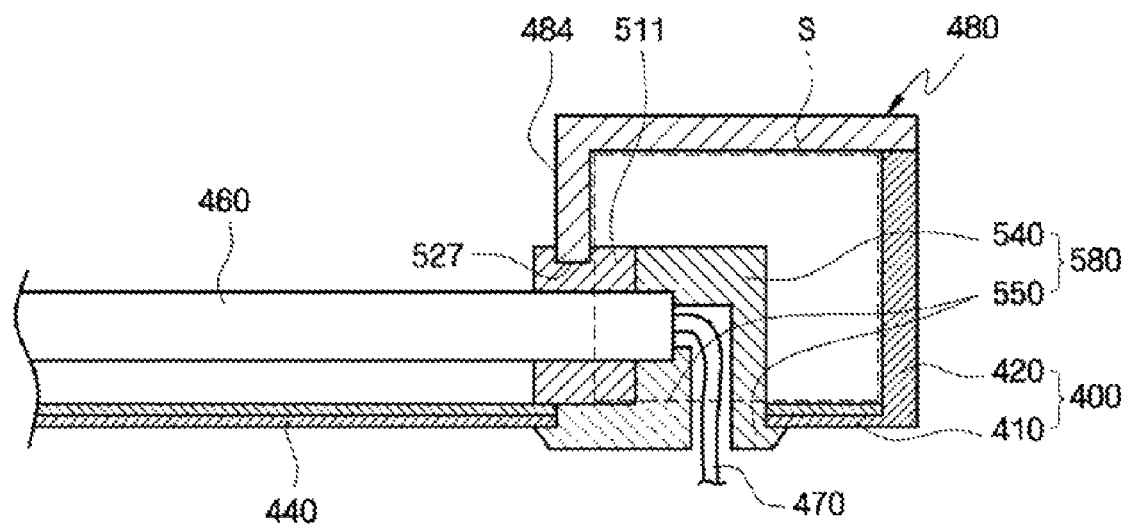
FIG. 5B is a cross-sectional view showing a structure in which the lamp holder of FIG. 5A is coupled to the back-light assembly according to an embodiment of the invention.

A lamp holder of a back-light assembly according to an embodiment of the invention will be described with reference to FIGS. 5A and 5B. FIG. 5A is a perspective view illustrating a lamp holder of a back-light assembly according to an embodiment of the invention. FIG. 5B is a cross-sectional view showing a structure in which the lamp holder of FIG. 5A is coupled to the back-light assembly.

Referring to FIG. 5A, guide grooves 527_1 and 527_2 are formed at first support parts 511_1 and 511_2 of a reflecting part 531 so as to be coupled to the side member 480. Referring to FIG. 5B, guide grooves 527 are formed at first support parts 511 such that corresponding portions of the insertion surface 484 of the side member 480 are positioned in the guide grooves 527. As a result, when the insertion surface 484 of the side member 480 is coupled to the first support part 511, light is prevented from leaking into the accommodating space S.

In FIGS. 5A and 5B, a lamp holder 501 in which the guide grooves 527_1 and 527_2 are formed at the reflecting part 531 is shown as an example, but it is not limited thereto. The guide grooves 527_1 and 527_2 may be formed at the second support part 540 of the absorbing part 580. When the guide grooves 527_1 and 527_2 are formed at the absorbing part 580, the first support parts 511 may be joined with the side member 480 such that only the first support parts 511 of the reflecting part 530 protrude through the through holes 482 from the accommodating space S.

Figure 6A:
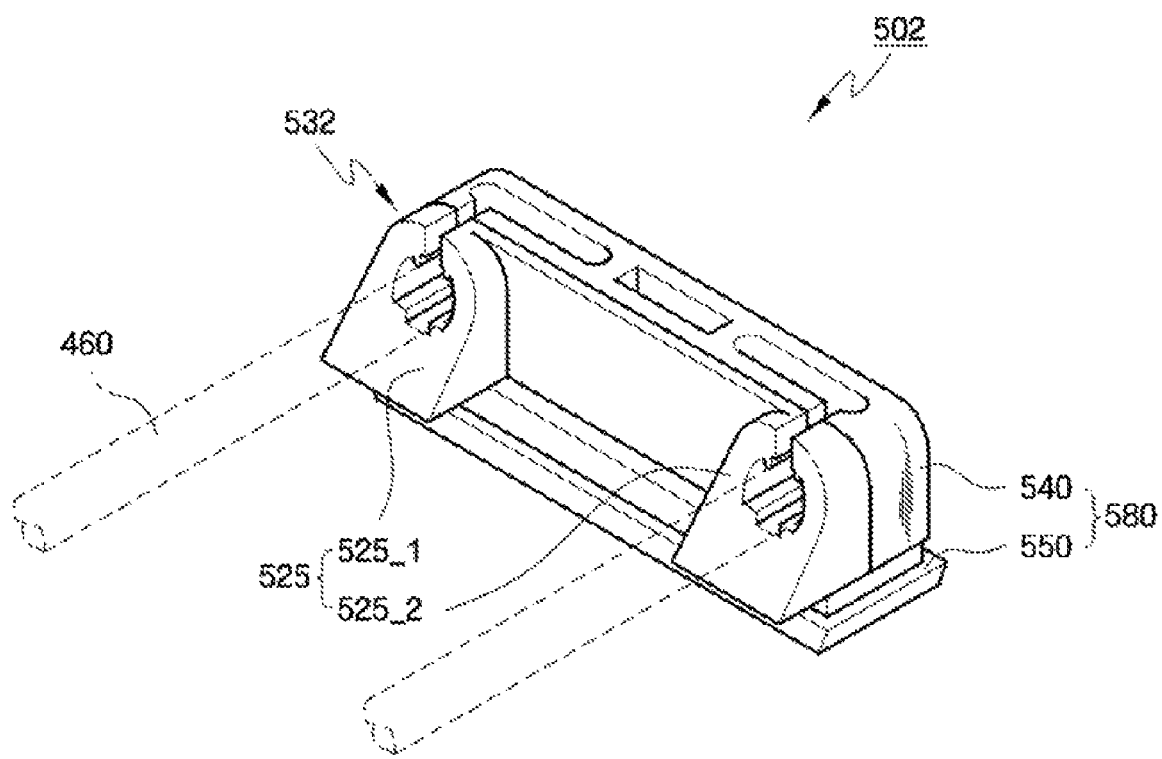
FIG. 6A is a perspective view illustrating a lamp holder of a back-light assembly according to an embodiment of the invention.
Figure 6B:
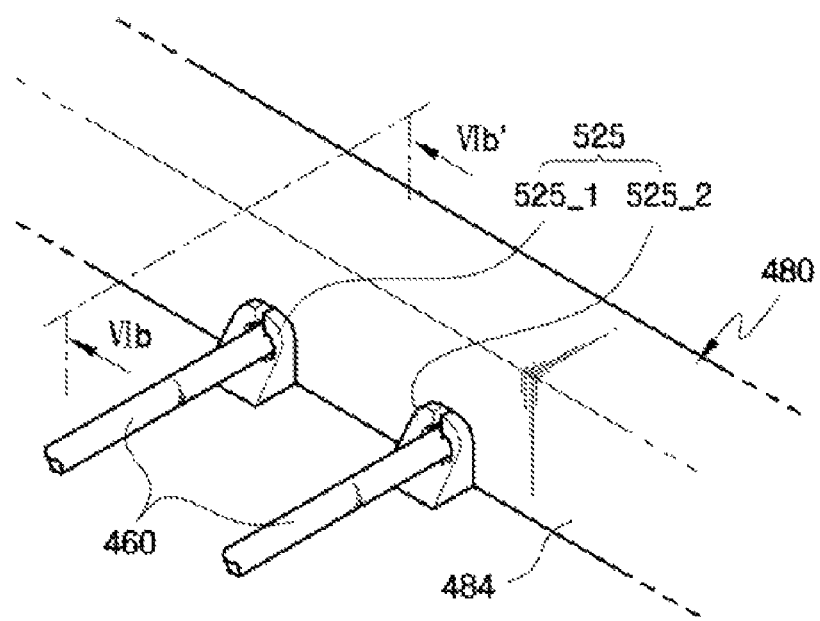
FIG. 6B is a perspective view showing a structure in which the lamp holder of FIG. 6A is coupled to the back-light assembly according to an embodiment of the invention.
Figure 6C:
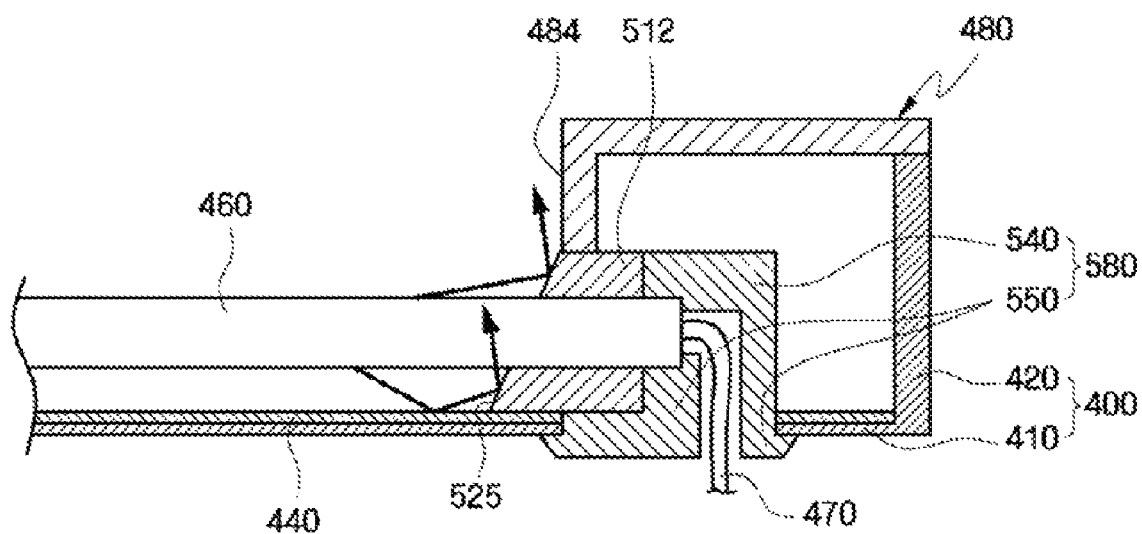
FIG. 6C is a cross-sectional view taken along the line VIb-VIb' of FIG. 6B.

A lamp holder of a back-light assembly according to an embodiment of the invention will be described with reference to FIGS. 6A to 6C. FIG. 6A is a perspective view illustrating the lamp holder of the back-light assembly according to an embodiment of the invention. FIG. 6B is a perspective view showing a structure in which the lamp holder of FIG. 6A is coupled to the back-light assembly. FIG. 6C is a cross-sectional view taken along the line VIb-VIb' of FIG. 6B. With reference to FIG. 6A, each of the lamps 460 is inserted into the inserting surfaces 525_1 and 525_2 of the reflecting part 532 which are inclined downward. A lamp holder 502 including the reflecting part 532, which is also inclined downward can improve reflection efficiency.

Referring to FIGS. 6B and 6C, the lamp holder 502 is joined with the bottom chassis 400 and the reflecting plate 440, and portions of the downwardly inclined inserting surfaces 525_1 and 525_2 protrude through the through holes 482. Inserting surfaces 525_1 and 525_2 of the first support part 512 are formed to be downwardly inclined such that lower portions of the surfaces coming in contact with the bottom chassis 400 and the reflecting plate 440 protrude farther than upper portions of the surfaces coming in contact with the insertion surface 484. That is, the inserting surfaces 525_1 and 525_2 are inclined so that an angle of about 90° or less is formed between one surface of the reflecting part 532 coming in contact with the bottom chassis 400 and the reflecting plate 440, and the inserting surfaces 525_1 and 525_2. Since the lamp holder 502 includes the reflecting part 532 in which the inserting surfaces 525_1 and 525_2 are downwardly inclined, the lamp holder 502 reflects light emitted from the lamp 460 toward an upper side of the back-light assembly, as shown in FIG. 6C.

Figure 7A:
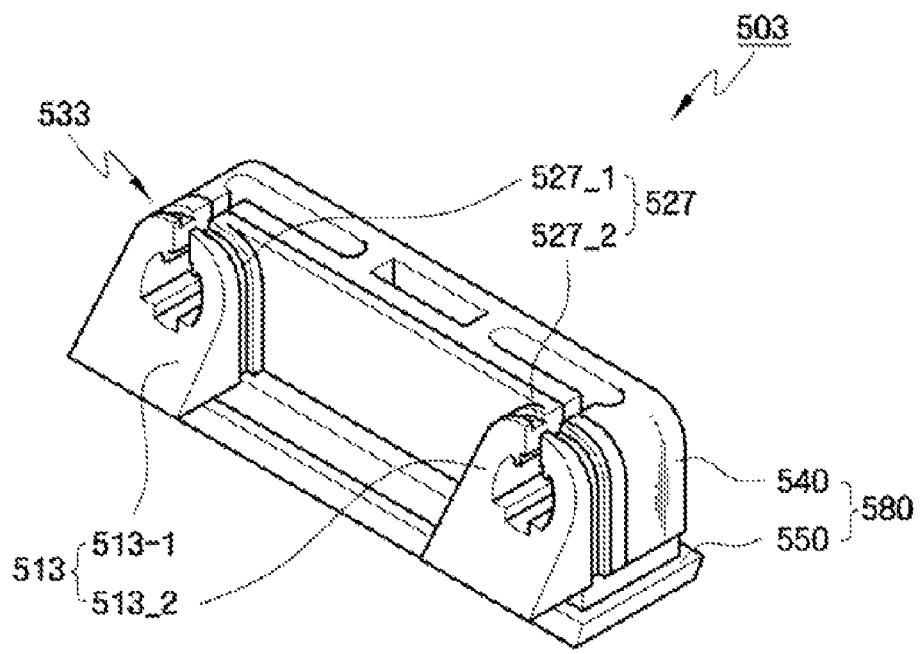
FIG. 7A is a perspective view illustrating a lamp holder of a back-light assembly according to an embodiment of the invention.
Figure 7B:
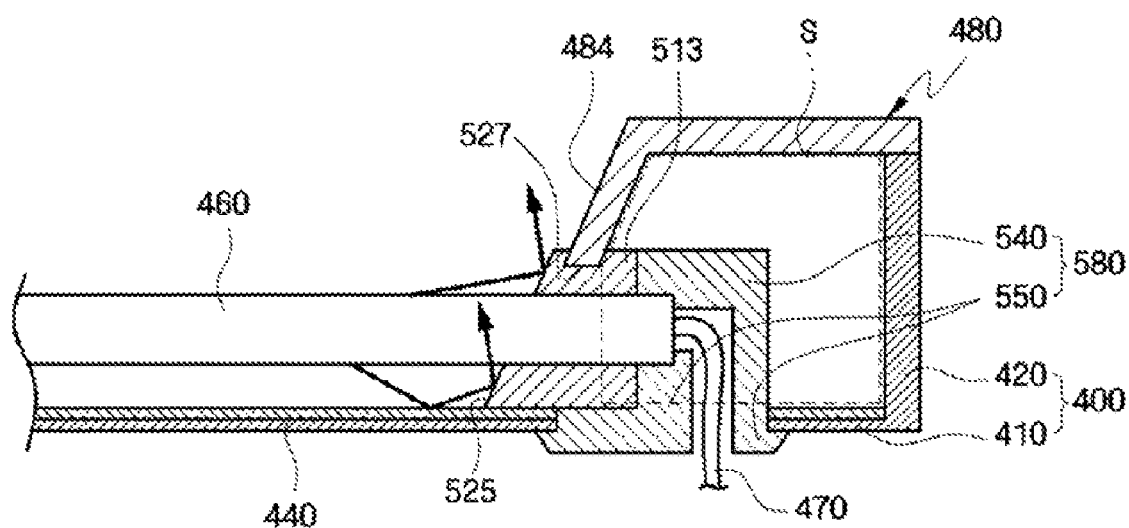
FIG. 7B is a cross-sectional view illustrating a structure in which the lamp holder of FIG. 7A is coupled to the back-light assembly according to an embodiment of the invention.

A lamp holder of a back-light assembly according to an embodiment of the invention will be described with reference to FIGS. 7A to 7B. FIG. 7A is a perspective view illustrating the lamp holder of the back-light assembly according to an embodiment of the invention. FIG. 7B is a cross-sectional view showing a structure in which the lamp holder of FIG. 7A is coupled to the back-light assembly. Referring to FIG. 7A, guide grooves 527_1 and 527_2 are formed at first support parts 513_1 and 513_2 of a reflecting part 533. A lamp holder 503 is coupled tightly to the side member 480, and prevents light from leaking through the through holes 482.

Referring to FIG. 7B, portions of the insertion surface 484 of the side member 480 fit into the guide grooves 527 formed at the first support parts 513_1 and 513_2. The downwardly inclined inserting surfaces 525 protrude through the through holes 482 toward the lamp 460. Light emitted from the lamp 460 is reflected by the downwardly inclined inserting surfaces 525 and travels toward the upper side of the back-light assembly. Since the first support parts 513 are coupled with the portions of the insertion surface 484 by the guide grooves 527_1 and 527_2, light is prevented from leaking into the accommodating space S. Since the bottom chassis 400 is joined with the reflecting plate 440 between the first support part 513 and the hook part 550, light is prevented from leaking through the rear side of the bottom chassis 400, that is, through the first joint holes 430.

FIGS. 7A and 7B show the lamp holder 503 in which the guide grooves 527_1 and 527_2 are formed at a reflecting part 533, but it is not limited thereto. The guide grooves 527_1 and 527_2 may be formed at the second support part 540 of the absorbing part 580. When the guide grooves 527_1 and 527_2 are formed at the absorbing part 580, the second support part 540 may be joined with the side member 480 such that only the reflecting part 533 protrudes through the through holes 482 from the accommodating space S.

Figure 8A:
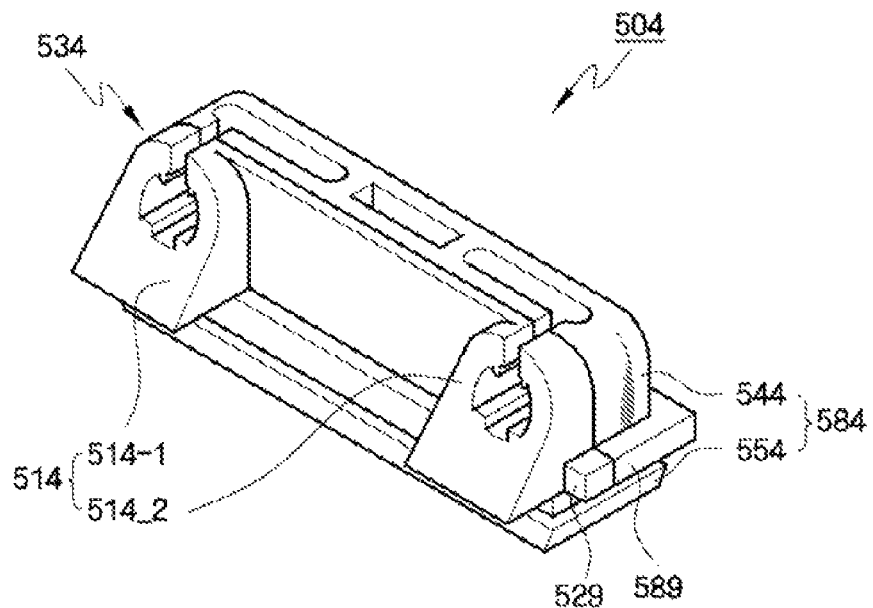
FIG. 8A is a perspective view illustrating a lamp holder of a back-light assembly according to an embodiment of the invention.
Figure 8B:
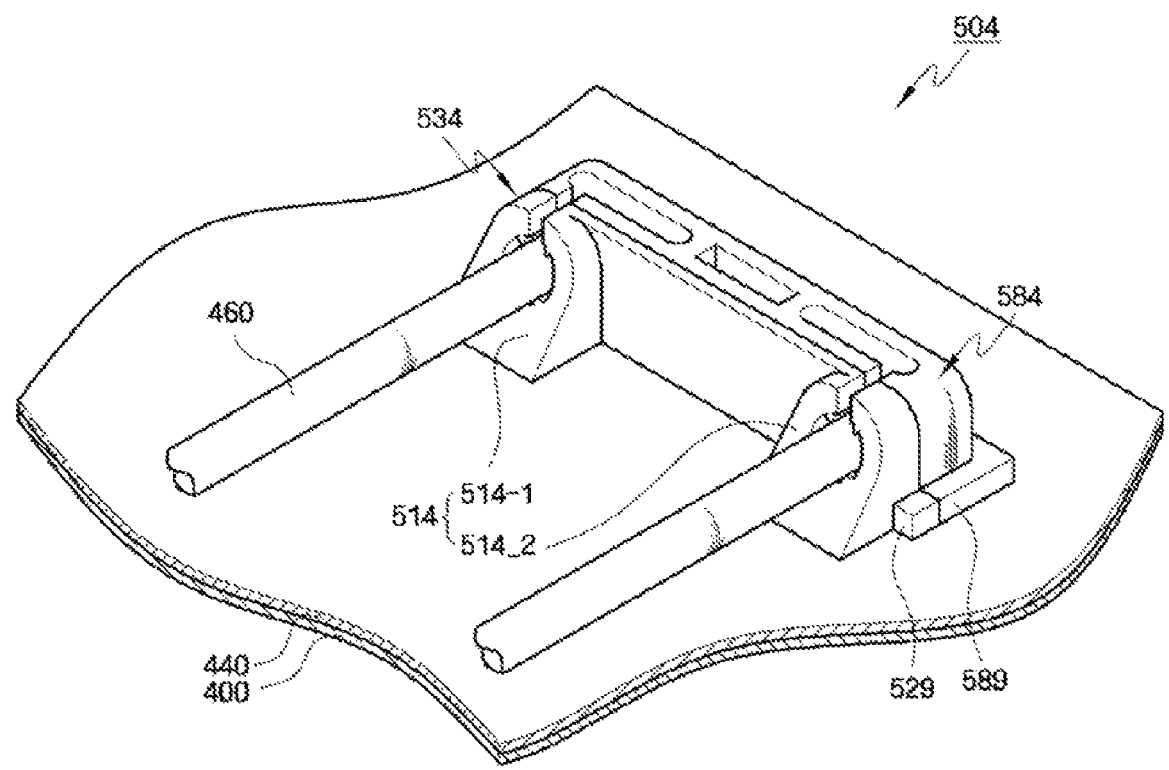
FIG. 8B is a perspective view showing a structure in which the lamp holder of FIG. 8A is coupled to a bottom chassis according to an embodiment of the invention.
Figure 8C:
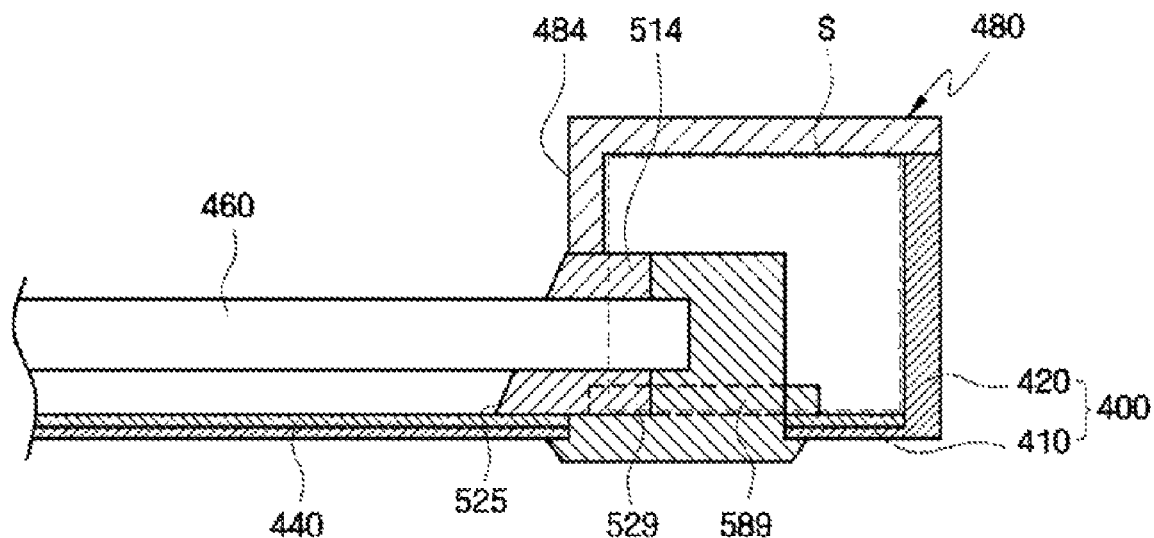
FIG. 8C is a cross-sectional view showing a structure in which the lamp holder of FIG. 8A is coupled to a back-light assembly according to an embodiment of the invention.

A lamp holder of a back-light assembly according to an embodiment of the invention will be described with reference to FIGS. 8A to 8C. FIG. 8A is a perspective view illustrating the lamp holder of the back-light assembly according to an embodiment of the invention. FIG. 8B is a perspective view showing a structure in which the lamp holder of FIG. 8A is coupled to the bottom chassis. FIG. 8C is a cross-sectional view showing a structure in which the lamp holder of FIG. 8A is coupled to the back-light assembly. The lamp wire drawing hole and the lamp wire are not shown in FIG. 8C to better illustrate the embodiment. With reference to FIG. 8A, each of the reflecting parts 534 and the absorbing parts 584 further includes stepped parts 529 and 589. The first stepped part 529 protrudes horizontally from the first support parts 514_1 and 514_2 of the reflecting part 534 so as to prevent light leakage. The second stepped part 589 protrudes horizontally from a second support part 544 of the absorbing part 580 so as to prevent light leakage.

Referring to FIGS. 8B and 8C, the bottom chassis 400 is joined with the reflecting plate 440 between the first stepped part 529 and the hook part 554 and between the second stepped part 589 and the hook part 554. Therefore, light leaking into the accommodating space S is prevented from leaking through the rear side of the bottom chassis 400, that is, through the first joint holes 430. Further, the bottom chassis 400 and the reflecting plate 440 may be joined tightly with the lamp holder 504.

The first stepped part 529 may be formed of the same resin as the first support part 514, and the second stepped part 589 may be formed of the same resin as the second support part 544. For example, the first stepped part 529 may be formed of a white resin, and the second stepped part 589 may be formed of a black resin.

FIGS. 8A to 8C show a lamp holder 504 which includes both the first stepped part 529 and the second stepped part 589. It is to be understood that the lamp holder 504 may include either the first stepped part 529 or the second stepped part 589. Further, a lamp holder in which the inserting surface 525 is not downwardly inclined may include the first stepped part 529 and the second stepped part 589.

Figure 9A:
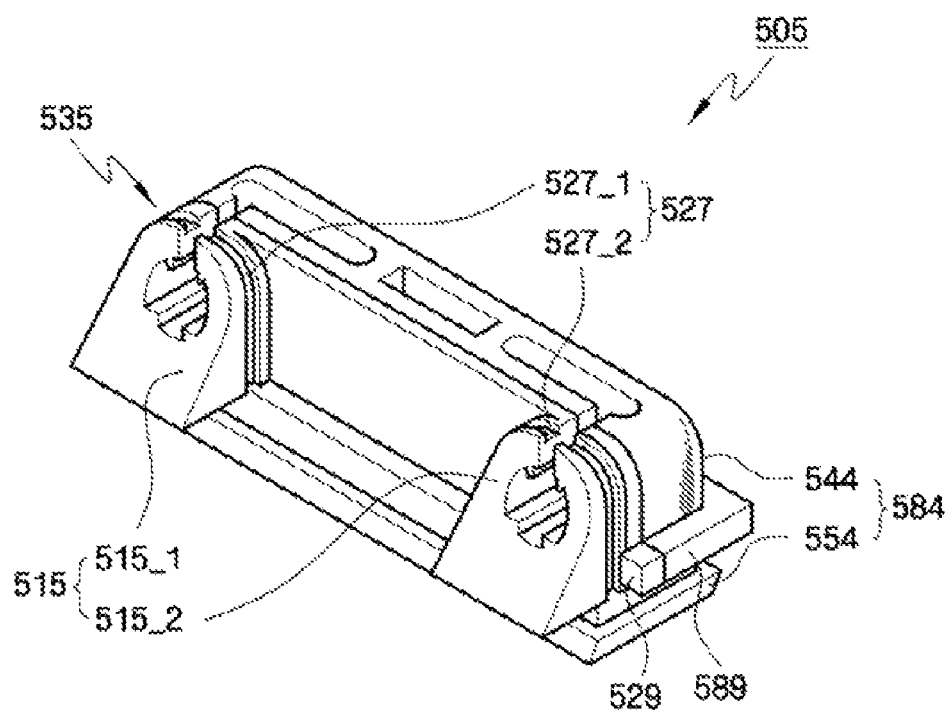
FIG. 9A is a perspective view illustrating a lamp holder of a back-light assembly according to an embodiment of the invention.
Figure 9B:
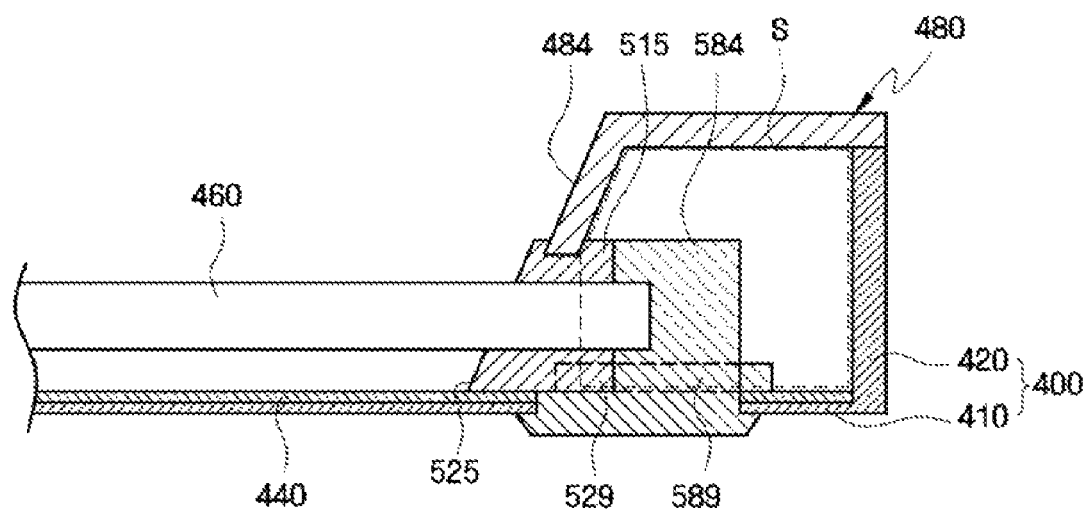
FIG. 9B is a cross-sectional view showing a structure in which the lamp holder of FIG. 9A is coupled to the back-light assembly according to an embodiment of the invention.

A lamp holder of a back-light assembly according to an embodiment of the invention will be described with reference to FIGS. 9A and 9B. FIG. 9A is a perspective view illustrating the lamp holder of the back-light assembly according to an embodiment of the invention. FIG. 9B is a cross-sectional view showing a structure in which the lamp holder of FIG. 9A is coupled to the back-light assembly. The lamp wire drawing hole and the lamp wire are not shown in FIG. 9B to better illustrate the embodiment. Referring to FIG. 9A, the guide grooves 527_1 and 527_2 are formed at first support parts 515_1 and 515_2 of reflecting parts 535 so that the guide grooves 527_1 and 527_2 receive portions of the insertion surface 484 of the side member 480. The lamp holder 505 is tightly joined with the side member 480, thus preventing light from leaking through the through holes 482.

Referring to FIG. 9B, portions of the insertion surface 484 of the side member 480 are inserted into the guide grooves 527 formed at first support parts 515, and the downwardly inclined inserting surfaces 525 protrude through the through holes 482 toward the lamp 460. Further, the bottom chassis 400 is joined with the reflecting plate 440 between the first stepped part 529 and the hook part 554 and between the second stepped part 589 and the hook part 554.

As a result, light is prevented from leaking into the accommodating space S, and is reflected by the inserting surface 525 and travels toward the upper side of the back-light assembly. Light leaking into the accommodating space S is not output to the rear side of the bottom chassis 400. Light leaking into the accommodating space S is absorbed by the absorbing part 584.

Figure 10:
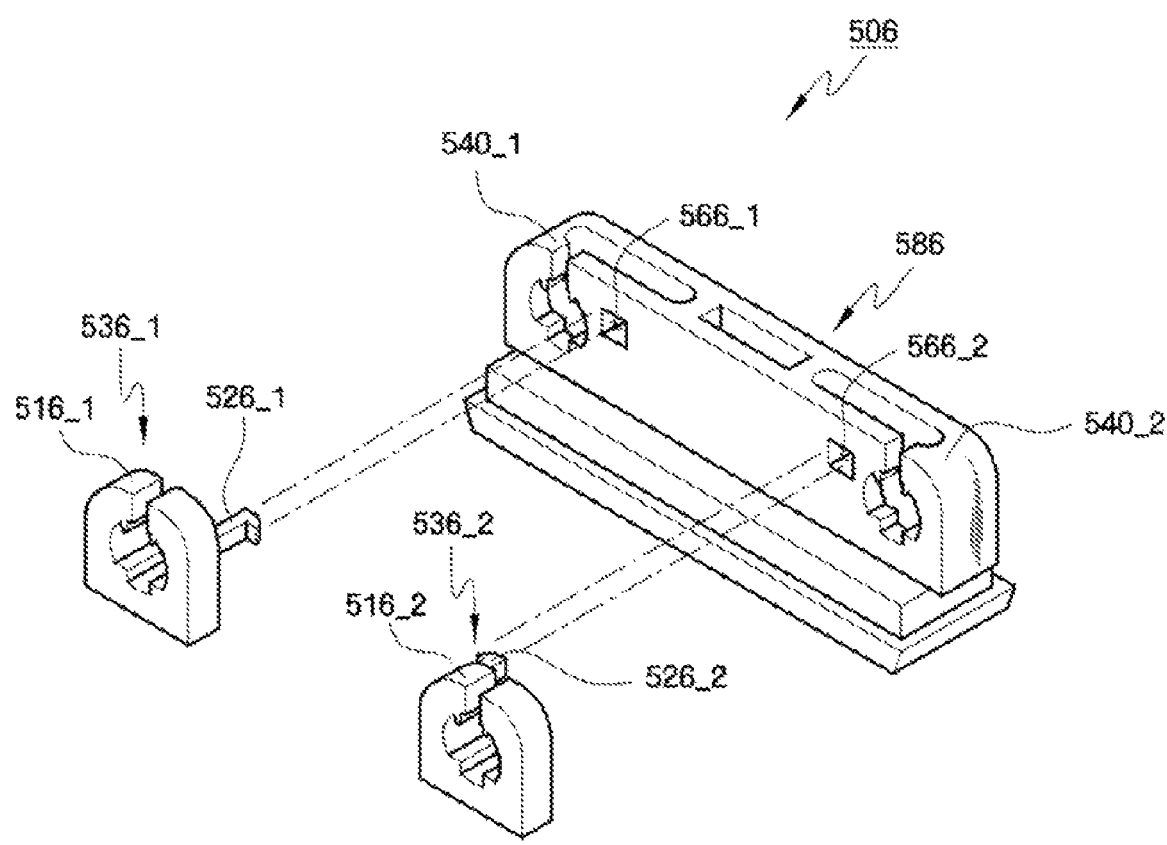
FIG. 10 is an exploded perspective view of a lamp holder of a back-light assembly according to an embodiment of the invention.
Figure 11:
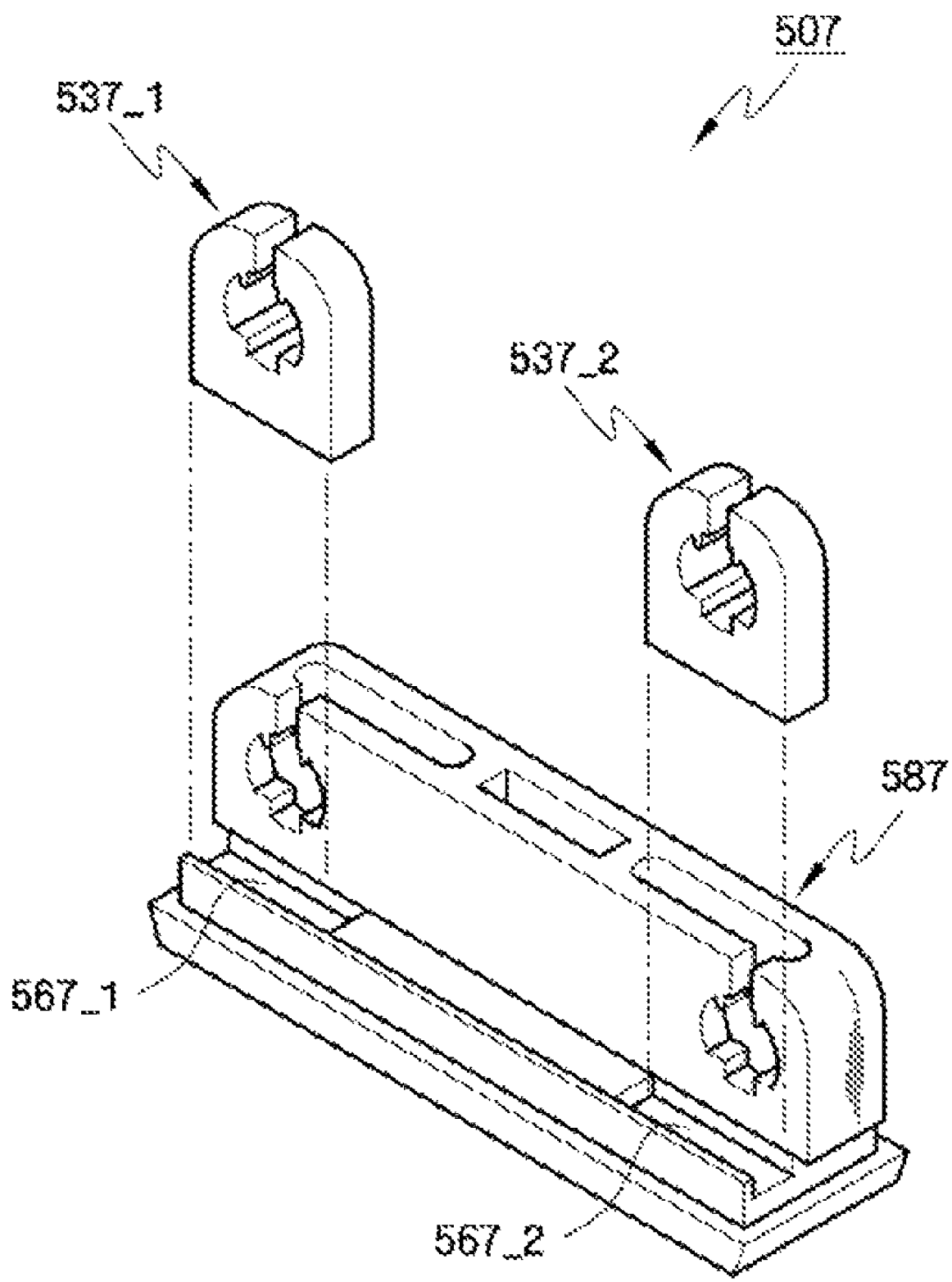
FIG. 11 is an exploded perspective view of a lamp holder of a back-light assembly according to an embodiment of the invention.

A lamp holder of a back-light assembly according to an embodiment of the invention will be described with reference to FIGS. 10 and 11. FIG. 10 is an exploded perspective view of the lamp holder of the back-light assembly according to an embodiment of the invention. FIG. 11 is an exploded perspective view of the lamp holder of the back-light assembly according to an embodiment of the invention. FIGS. 10 and 11 show alternative methods of coupling a reflecting part to an absorbing part.

Referring to FIG. 10, each of the reflecting parts 536_1 and 536_2 has a first support part 516_1 and 516_2 and a joint part 526_1 and 526_2, and is coupled to an absorbing part 586 including two second support parts 540_1 and 540_2. Joint holes 566_1 and 566_2 are formed in the absorbing part 586.

Referring to FIG. 11, ring shaped reflecting parts 537_1 and 537_2 are received bu guide grooves 567_1 and 567_2 formed at an absorbing part 587.

As described above, FIGS. 10 and 11 show alternatives for coupling the reflecting parts (536_1 and 536_2, and 537_1 and 537_2) to the absorbing parts 586 and 587, but the invention is not limited thereto.

Figure 12A:
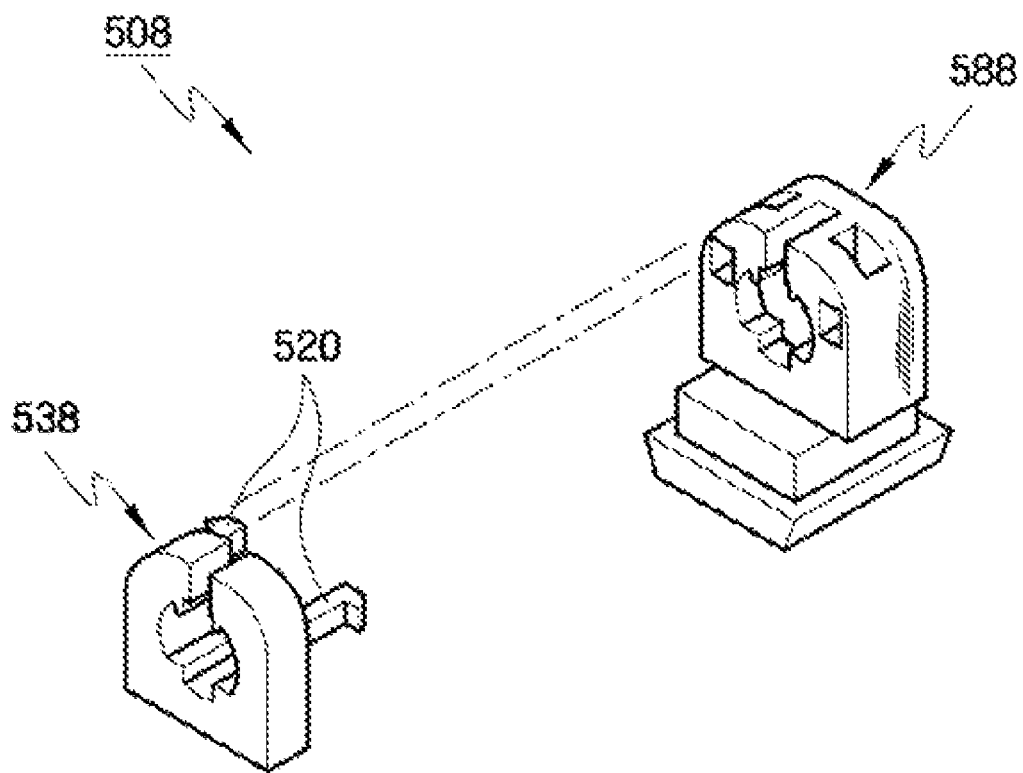
FIG. 12A is an exploded perspective view illustrating a lamp holder of a back-light assembly according to an embodiment of the invention.

A lamp holder of a back-light assembly according to an embodiment of the invention will be described with reference to FIGS. 12A and 12B. FIG. 12A is an exploded perspective view illustrating the lamp holder of the back-light assembly according to an embodiment of the invention FIG. 12B is a perspective view of the lamp holder of FIG. 12A.

Figure 12B:
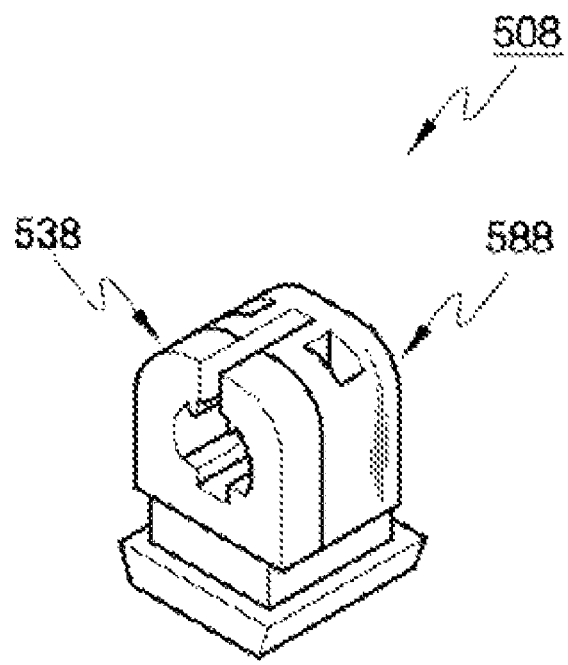
FIG. 12B is a perspective view of the lamp holder of FIG. 12A.

Referring to FIGS. 12A and 12B, differences from the previous embodiments include that a lamp holder 508 includes one reflecting part 538 and a corresponding absorbing part 588, which is smaller relative to the previous embodiments.

Each of the lamp holders may include a reflecting part 538 and an absorbing part 588 as shown in FIGS. 12A and 12B. A plurality of reflecting parts and a plurality of absorbing parts corresponding to the reflecting parts may be provided to support lamps of a back-light assembly.

FIGS. 12A-12B show a lamp holder formed by coupling the reflecting part to the absorbing part. Alternatively, the lamp holder may have an integrated structure of the reflecting part and the absorbing part.

Figure 13:
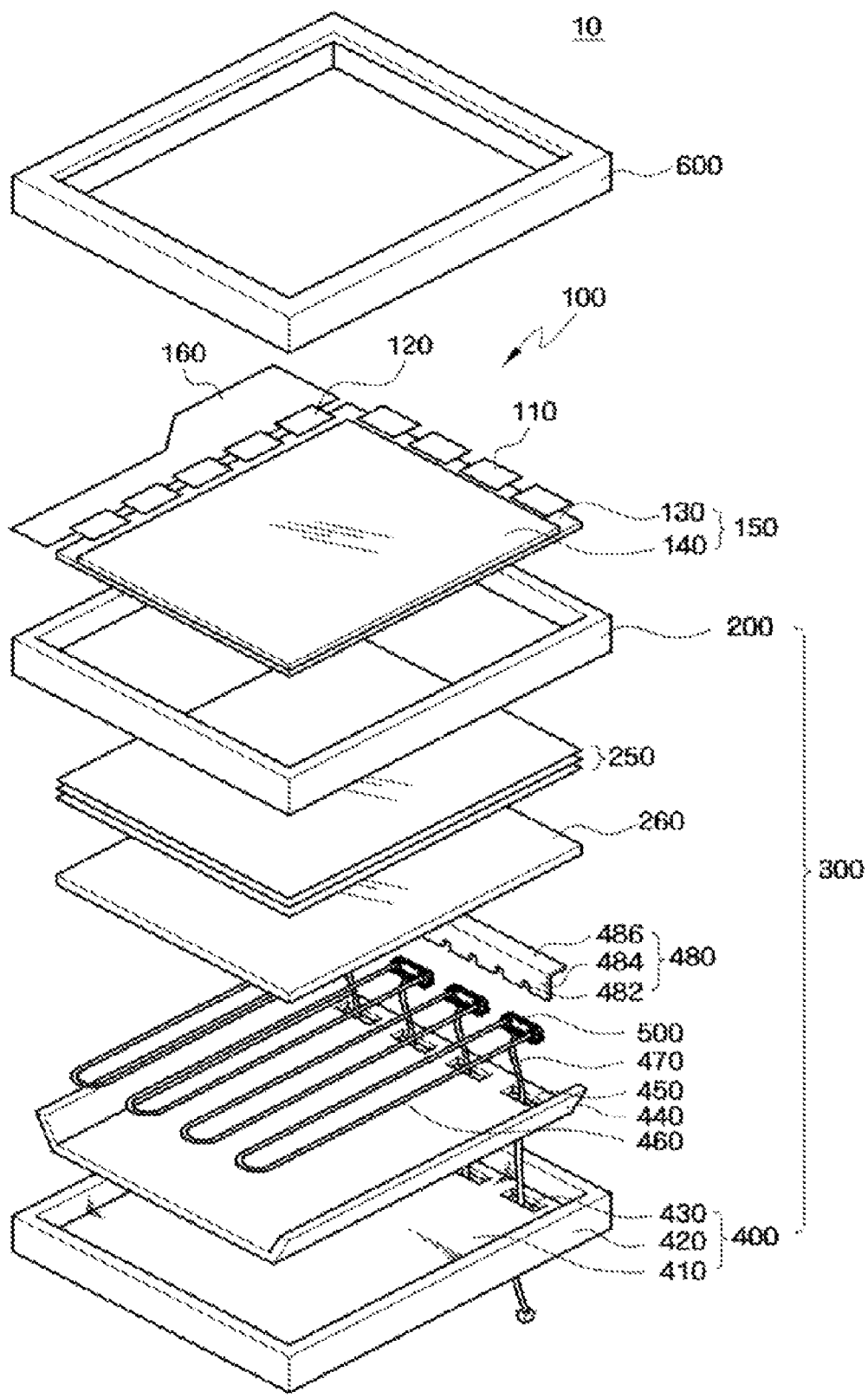
FIG. 13 is an exploded perspective view illustrating a liquid crystal display according to an embodiment of the invention.

A liquid crystal display according to an embodiment of the invention will be described with reference to FIG. 13. FIG. 13 is an exploded perspective view illustrating the liquid crystal display according to an embodiment of the invention. A liquid crystal display 10 includes a liquid crystal panel assembly 100, a back-light assembly 300, and a top chassis 600.

The liquid crystal panel assembly 100 has a liquid crystal panel 150 including a thin film transistor display panel 130 and a common electrode display panel 140, liquid crystal (not shown), gate tape carrier packages 110, data tape carrier packages 120, and a print circuit board 160.

The liquid crystal panel 150 includes the thin film transistor display panel 130 which comprises gate lines (not shown), data lines (not shown), a thin film transistor array (not shown), pixel electrodes (not shown), etc.; and the common electrode display panel 140 which comprises a black matrix (not shown) and common electrodes (not shown) and is disposed to face the thin film transistor display panel 130.

The gate tape carrier package 110 is connected to each of the gate lines formed in the thin film transistor display panel 130, and the data tape carrier package 140 is connected to each of the data lines formed in the thin film transistor display panel 130.

Driving components (not shown) are mounted in the print circuit board 160 so as to process gate driving signals provided to the gate tape carrier package 110 and data driving signals provided to the data tape carrier package 120.

The liquid crystal panel assembly 100 is located at the upper side of the back-light assembly 300 so as to receive light and display images.

The back-light assembly 300 includes a support member 200, optical sheets 250, an optical plate 260, the side member 480, lamps 460, the reflecting plate 440, and the bottom chassis 400.

The support member 200 supports the liquid crystal panel assembly 100.

The optical plate 260 may be disposed at the upper side of the lamp 460, so as to improve uniformity in the luminance of the light emitted from the lamp 460.

The optical sheets 250 are disposed at the upper side of the optical plate 260, to diffuse and condense light delivered from the lamp. The optical sheets 250 include, for example, a diffusion sheet, a first prism sheet, and a second prism sheet.

For example, the diffusion sheet is located at the upper side of the lamp 460, and improves luminance and luminance uniformity of incident light from the lamp 460. The first prism sheet is located at the upper side of the diffusion sheet, and a trigonal prism pattern (not shown), which condenses light diffused from the diffusion sheet, may be arranged in a predetermined pattern on one side of the first prism sheet. For example, a brightness enhancement film (BEF-III™, manufacturing company 3M) may be used as a first prism sheet. The second prism sheet, which is located at the upper side of the first prism sheet, may be a reflecting polarization prism sheet having a multilayer structure which condenses and polarizes light so as to output the light. For example, a dual brightness enhancement film (DBEF™, manufacturing company 3M) may be used as the second prism sheet. Alternatively, the second prism sheet can be excluded.

The side member 480 is supported by the side surface 420 of the bottom chassis 400, and supports the optical plate 260 and the optical sheets 250. In FIG. 13, the side member 480 is provided only at one side of the lamp holder 500. Alternatively, an additional side member (not shown) may be provided at the other side facing the one side. The side member 480 may be a mold frame formed of plastic material. Alternatively, the side member 480 may be formed of rigid paper, or synthetic fiber or the like.

The lamps 460 are accommodated in the bottom chassis 400 so as to emit light, and are supported by the lamp holders 500. The shape of the lamp 460 is not limited to that of FIG. 13, and may be modified.

The reflecting plate 440 is located at the lower side of the lamp 460 so as to reflect light emitting to the lower side of the lamp 460 toward the upper side.

The bottom chassis 400 includes the bottom surface 410 and the side surface 420 extending from the bottom surface 410. One or more first joint holes 430 formed in the bottom surface 410 receive the lamp holders 500. The bottom chassis 400 accommodates the reflecting plate 440, the lamp 460 and the lamp holder 500.

A top chassis 600 is disposed to be coupled with the bottom chassis 400 so as to cover the top surface of the liquid crystal panel assembly 100 accommodated in the bottom chassis 400. A window is formed through the top surface of the top chassis 600 so as to expose the liquid crystal panel assembly 100.

As described above, the lamp holder 500 is coupled to the bottom chassis 400 and the reflecting plate 440, and supports the lamp 460, thus preventing light from leaking through the rear side of the bottom chassis 400, and improving luminance.

The top chassis 600 may be coupled with the bottom chassis 400 by a hook (not shown) and/or a screw (not shown). In addition, the top chassis 600 may be coupled to the bottom chassis 400 by alternative mechanisms.

In the liquid crystal display 10, the back-light assembly 300 is not limited thereto. The liquid crystal display 10 may include the back-light assembly according to any of the above-described embodiments.

As described above, with the back-light assembly according to the embodiments of the invention and the liquid crystal display including the same, it is possible to prevent light leakage and improve luminance, thus improving display quality.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A back-light assembly comprising:
   a lamp emitting light;
   a lamp holder comprising a reflecting part and an absorbing part into which the lamp is inserted, wherein the absorbing part is positioned behind the reflecting part so that an end of the inserted lamp passes through the reflecting part into the absorbing part, wherein the absorbing part absorbs the light, and the reflecting part reflects the light;
   a side member comprising a through hole, the lamp being inserted into the through hole;
   a bottom chassis comprising a bottom surface and side surfaces, the side surfaces extending from the bottom surface; and
   reflecting plate formed on the bottom surface of the bottom chassis, wherein:
   the bottom chassis further joint hole being formed in the bottom surface,
   the absorbing part comprises a support part supporting the lamp, a stepped part protruding from the support part and a hook part located at a lower side of the support part, wherein the hook part is hooked to the joint hole, and
   the bottom chassis and the reflecting plate are positioned between the stepped part and the hook part.

2. The back-light assembly of claim 1, wherein the lamp holder is joined with the through hole.

3. The back-light assembly of claim 1, wherein the reflecting part includes a downwardly inclined inserting surface into which the lamp is inserted.

4. The back-light assembly of claim 1, wherein:
   the reflecting part further comprises another support part supporting the lamp and another stepped part protruding from the other support part; and
   the bottom chassis is positioned between the other stepped part and the hook part.

5. The back-light assembly of claim 1, wherein the joint hole receives a portion of the absorbing part therein, wherein the absorbing part comprises a lamp wire drawing hole leading to the joint hole.

6. The back-light assembly of claim 1, wherein the reflecting part is formed of a white resin, and the absorbing part is formed of a black resin.

7. A liquid crystal display comprising:
   a back-light assembly comprising a lamp emitting light, a lamp holder comprising a reflecting part and an absorbing part into which the lamp is inserted, wherein the absorbing part is positioned behind the reflecting part so that an end of the inserted lamp passes through the reflecting part into the absorbing part, wherein the absorbing part absorbs the light, and the reflecting part reflects the light, a side member comprising a through hole, the lamp being inserted into the through hole, a bottom chassis comprising a bottom surface and side surfaces, the side surfaces extending from the bottom surface, and a reflecting plate formed on the bottom surface of the bottom chassis, wherein:
   the bottom chassis further comprises a joint hole being formed in the bottom surface,
   the absorbing part comprises a support part supporting the lamp, a stepped part protruding from the support part and a hook part located at a lower side of the support part, wherein the hook part hooked to the joint hole, and the bottom chassis and the reflecting plate are positioned between the stepped and the hook part; and a liquid crystal panel assembly receiving the light.

8. The liquid crystal display of claim 7, wherein the lamp holder is joined with the through hole.

9. The liquid crystal display of claim 7, wherein the reflecting part includes a downwardly inclined inserting surface into which the lamp is inserted.

10. The liquid crystal display of claim 7, wherein:

the reflecting part further comprises another support part supporting the lamp and another stepped part protruding from the other support part; and the bottom chassis is positioned between the other stepped part and the hook part.

11. The liquid crystal display of claim 7, wherein the joint hole receives a portion of the absorbing part therein, wherein the absorbing part comprises a lamp wire drawing hole leading to the joint hole.

12. The liquid crystal display of claim 7, wherein the reflecting part is formed of a white resin, and the absorbing part is formed of a black resin.

13. The back-light assembly of claim 1, wherein the hook part is positioned under the bottom chassis and the reflecting plate.

14. The liquid crystal display of claim 7, wherein the hook part is positioned under the bottom chassis and the reflecting plate.

* * * * *